(12) United States Patent
Hassan et al.

(10) Patent No.: US 8,295,189 B2
(45) Date of Patent: Oct. 23, 2012

(54) INTERFERENCE DETECTION

(75) Inventors: Amer A. Hassan, Kirkland, WA (US);
Bernard D. Aboba, Bellevue, WA (US);
Jiansong Zhang, Beijing (CN); Kun Tan, Beijing (CN)

(73) Assignee: Microsoft Corporation, Redmond, WA (US)

( * ) Notice: Subject to any disclaimer, the term of this patent is extended or adjusted under 35 U.S.C. 154(b) by 590 days.

(21) Appl. No.: 11/801,803

(22) Filed: May 11, 2007

(65) Prior Publication Data
US 2008/0279093 A1 Nov. 13, 2008

(51) Int. Cl.
H04J 1/16 (2006.01)
(52) U.S. Cl. .......................... 370/252; 340/477; 340/468
(58) Field of Classification Search .................. 370/310, 370/468, 477, 230, 328, 332, 329, 341, 337, 370/347, 431, 442, 334
See application file for complete search history.

(56) References Cited

U.S. PATENT DOCUMENTS

| | | | |
|---|---|---|---|
| 5,706,428 A | 1/1998 | Boer et al. | |
| 6,163,766 A | 12/2000 | Kleider et al. | |
| 6,539,205 B1* | 3/2003 | Wan et al. | 370/465 |
| 6,947,397 B2 | 9/2005 | Kim et al. | |
| 6,959,171 B2 | 10/2005 | Tsien et al. | |
| 7,099,398 B1 | 8/2006 | Girardeau et al. | |
| 7,529,288 B2* | 5/2009 | Felbecker et al. | 375/133 |
| 2004/0101035 A1 | 5/2004 | Boer et al. | |
| 2005/0286440 A1* | 12/2005 | Strutt et al. | 370/253 |
| 2006/0198305 A1 | 9/2006 | Hamdi | |
| 2008/0219323 A1* | 9/2008 | Desai et al. | 375/132 |

FOREIGN PATENT DOCUMENTS
WO WO2006000611 A1 1/2006

OTHER PUBLICATIONS

"Adaptive Rate Controller for Mobile Ad Hoc Networks" was downloaded at http://www.inderscience.com on Mar. 21, 2007.
"IEEE 802.11 MAC Performance with Variable Transmission Rates" was downloaded at http://www.ietcom.oxfordjournals.org on Mar. 21, 2007.
Javier del Prado Pavon et al., "Link Adaptation Strategy for IEEE 802.11 WLAN Via Received Signal Strength Measurement" *Wireless Communications and Networking Philips Research USA*, 6 pps.
Jongseok Kim et al., "CARA: Collision-Aware Rate Adaptation for IEEE 802.11 WLANs", *School of Electrical Engineering and INMC Seoul National University*, 11 pps.
H. Gharavi et al., "Rate Adaptive Video Transmission over Ad-Hoc Networks" *Electronic Letters*, vol. 40, No. 19, Sep. 16, 2004, pp. 2.

* cited by examiner

*Primary Examiner* — Kibrom T Hailu
*Assistant Examiner* — Dady Chery

(57) ABSTRACT

A computing device configured for wireless communication may effectively control adaptation to channel conditions. The device may be configured to identify and classify conditions impacting performance of a channel so that appropriate adaptations may be made. Interference may be detected by correlating received signal strength and packet errors. High received signal strength correlated to a high packet error rate may signify presence of a source of interference. Once a source of interference is detected, other criteria may be used to determine the nature of the interference so that an adaptation that is minimally disruptive of applications can be selected. Additionally, channel degradation may be predicted by monitoring trends in error rates, including Forward Error Correction rates, and adaptation may be used before packet error rates exceed an unacceptable level.

19 Claims, 12 Drawing Sheets

| Data rate | $SNR_{low}$ | $SNR_{high}$ |
|---|---|---|
| 6 | 5 | 12 |
| 9 | 7 | 16 |
| 12 | 11 | 15 |
| ... | ... | ... |

FIG. 7C

INTERFERENCE DETECTION

BACKGROUND

Many mobile computing devices support wireless communications so that users may connect those devices to networks without constraints on mobility imposed by wired connections. However, wireless communications are susceptible to many conditions that can degrade network performance. For example, if a mobile device is too far from an access point, the wireless signal that it transmits or receives may be too weak to effectively carry information. As another example, a source of interference that is too close to the mobile computing device can interrupt communication.

Because of these possible sources of problems in wireless communication, wireless communication protocols such as IEEE 802.11 include error correction attributes. Error correction is achieved by encoding a transmitted packet using a redundant scheme that allows a receiving device to identify both that a change has occurred and what has changed between transmission and reception of the packet. If more redundancy is used to encode a packet, more errors can be detected and corrected. For example, a standard encoding scheme may provide a redundant encoding scheme sufficient to correct errors in multiple bits, such as six or eight bits in a packet.

Wireless protocols may also specify mechanisms that allow devices communicating over a wireless channel to adapt to conditions in a channel. For example, devices may adapt to a high level of dropped packets by increasing the amount of redundancy used for encoding packets so that more errors can be corrected for each packet. Alternatively, devices could adapt by increasing the power level used for transmission or decreasing the data rate communicated over the channel. When changes to the characteristics of signals communicated in a channel are not effective, devices may adapt by changing channels used for communication.

SUMMARY OF INVENTION

To increase the effectiveness of wireless communication, and therefore the utility of mobile devices that communicate wirelessly, wireless devices may collect information that facilitates control of wireless communication devices to adapt to conditions in a channel. The information may be used to control what adaptation is performed and/or the time at which such adaptation is made.

In one aspect, the invention relates to identifying that a source of interference is impacting communication in a channel. In some embodiments, a source of interference is detected from an analysis of an error rate and a received signal strength. A high error rate with a high received signal strength is treated as an indication that a source of interference is present and adaptation appropriate to allow communication in the presence of a source of interference may be employed. In some embodiments, the error rate may be determined by measuring dropped packets. Though, in other embodiments, channel conditions may be determined from errors corrected (or history of errors corrected) using error correcting encoding for packets. In some embodiments, the received signal strength may be determined from a received signal strength for ACK packets.

In another aspect, the invention relates to identifying deteriorating conditions in a channel before channel conditions preclude use of the channel for communication. Information on deteriorating channel conditions allows a user or device to proactively adapt before communications are disrupted. In some embodiments, deteriorating conditions may be detected based on error correction performed on received packets. A trend showing an increase in the magnitude of errors corrected may signify deteriorating channel conditions for which adaptation is required.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 7C is a sketch of a calibration table used in the method of FIGS. 8A-8C according to some embodiments of the invention.

DETAILED DESCRIPTION

The inventors have appreciated that information collected by wireless devices can be used to facilitate control of wireless communication devices to take corrective action in response to conditions or predicted conditions in a channel that do not support a desired level of communication. The information may be used to control what corrective action is performed and/or the time at which such corrective action is made.

The inventors have further appreciated that different types of the information collected by wireless devices can be used to determine a suitable corrective action for current conditions in the channel. Depending on conditions in the channel, different/or corrective actions may be applied to ameliorate the effects of channel conditions so that the channel can provide data transmission of a desirable rate and quality. Furthermore, by monitoring and analyzing transmission parameters, the effectiveness of the corrective actions may be assessed.

Figure 1A:
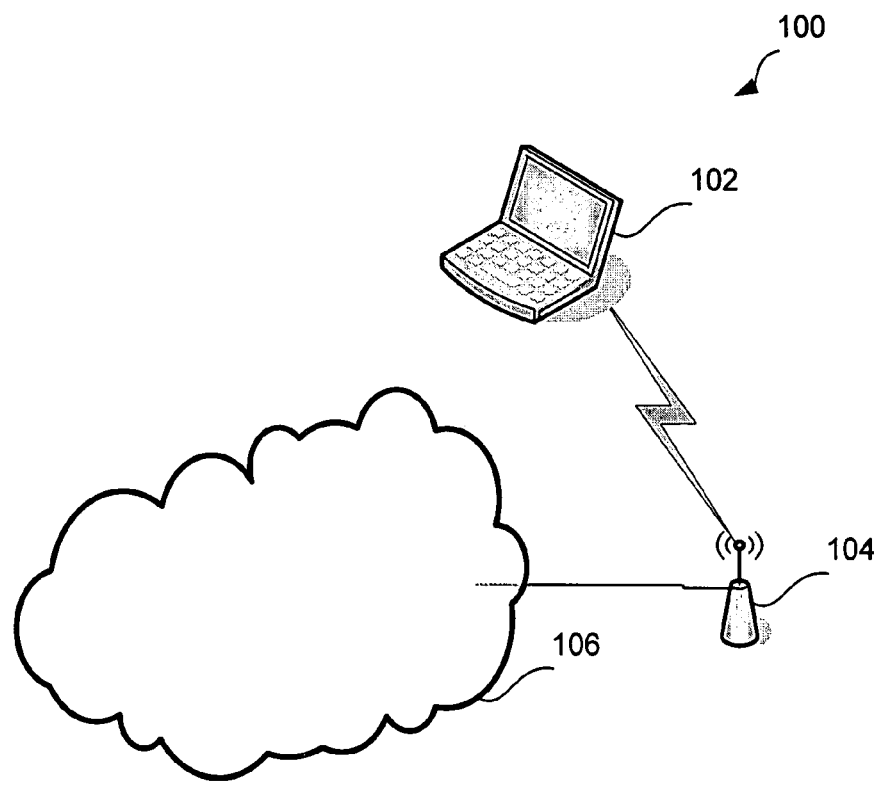
FIG. 1A is a diagram illustrating an example of an environment in which a computing device may communicate packets over a wireless network.

Computing devices communicating network packets over a wireless network may find themselves in different situations. FIG. 1A illustrates an exemplary system 100 including a computing device 102 connected, via an access point 104 to a network 106. The computing device 102 may be any device (e.g., a mobile station) enabled to receive and transmit network packets via a wireless connection. Also, though a wireless access point is illustrated, computing device 102 may communicate with any other wireless device, such as a wireless enabled server or another mobile device equipped for wireless communication.

The exact forms of the communications are not critical to the invention. It should be appreciated that communications over a wireless network may be referred to herein as network "packets" by way of example only and not to limit the scope of the invention, which may operate in connection with network communications of any type. Communications may sometimes be called "frames," "codewords," "datagrams" or "messages." Accordingly, the term packet shall be broadly construed to encompass information transmitted in any suitable unit in any suitable format.

In general, it is desirable for a computing device to transmit data at a high data rate with low power. However, a high data rate and low power may create conflicting requirements on the wireless communication because higher power may be required to reliably transmit at a high data rate. Accordingly, wireless computing devices are known to employ adaptation techniques that result in an acceptable data rate and power level for wireless communications. As part of an adaptation process, one or more transmission characteristics may be modified. For example, a specification for wireless communication may define one or more parameters that may be varied. These parameters may include a transmission rate, a power level, an error correction coding, a symbol encoding, or a number of retransmission attempts. Additionally, a wireless specification may support changing channels to avoid interference sending messages that silence interfering devices (such as RCS/PCS signals in the 802.11 specification). Further, a wireless device may be configured to allow a wireless network interface to signal to an application to lower its data rate or may even switch from one wireless technology to another, if the device is configured to communicate using more than one wireless technology. However, the specific form of adaptation that will be effective in any given scenario may depend on the channel conditions at the time.

In the example illustrated in FIG. 1A, factors such as, for example, a distance between the computing device 102 and the access point 104 may affect the strength of the received signal. The signal may become attenuated as the computing device 102 moves farther away from the access point 104, lowering the signal level. Additional factors of environments such as obstructions may contribute to the attenuation of the signal and other undesirable changes in channel conditions.

Figure 1B:
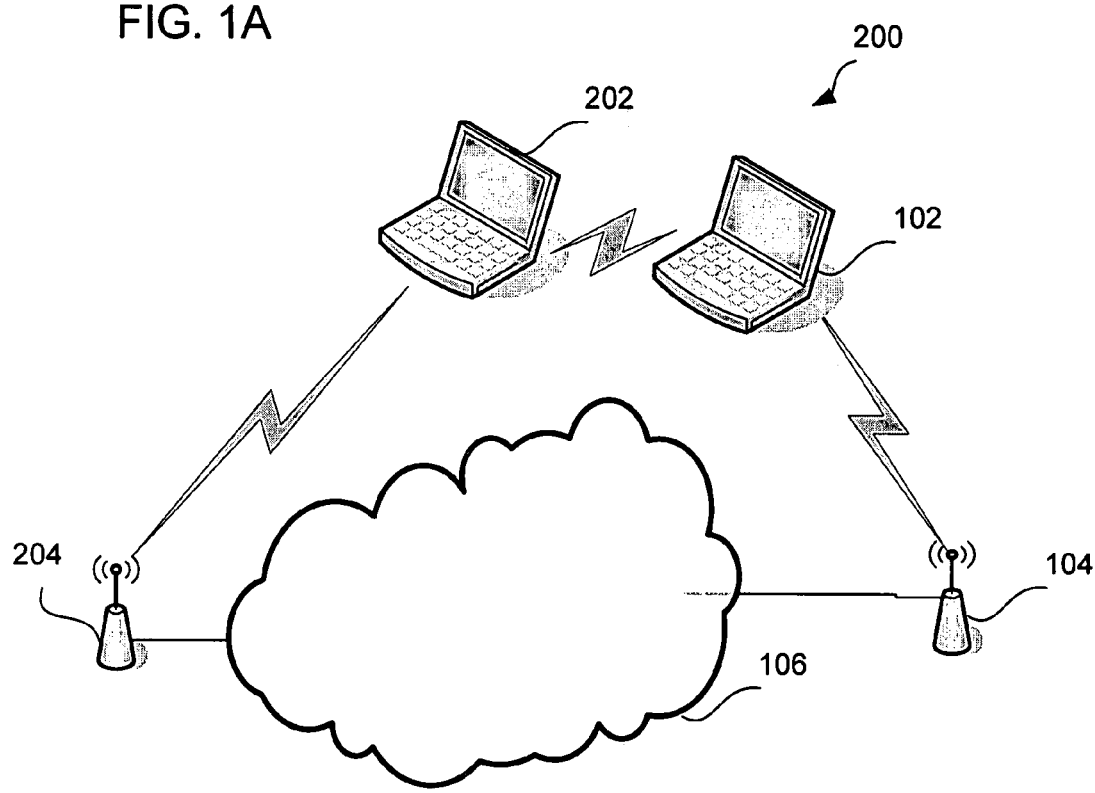
FIG. 1B is a diagram illustrating an example of an environment in which a computing device may communicate packets over wireless networks in the presence of a source of interference.

Another situation is illustrated in FIG. 1B where a system 200 includes, in addition to components shown in FIG. 1A, a computing device 202 associated with an access point 204. The computing devices 102 and 202, each of which may act as a receiver and/or transmitter, may simultaneously transmit packets. According to the 802.11 protocol, computing devices in close proximity should be sent over different frequencies or at different times such that packets transmitted by either device do not interfere with the other device. However, scenarios exist in which the packets sent by computing device 202 may act as a source of interference for device 102. Accordingly, scenarios exist in which an 802.11 device acts as a source of interference for another 802.11 device.

Figure 1C:
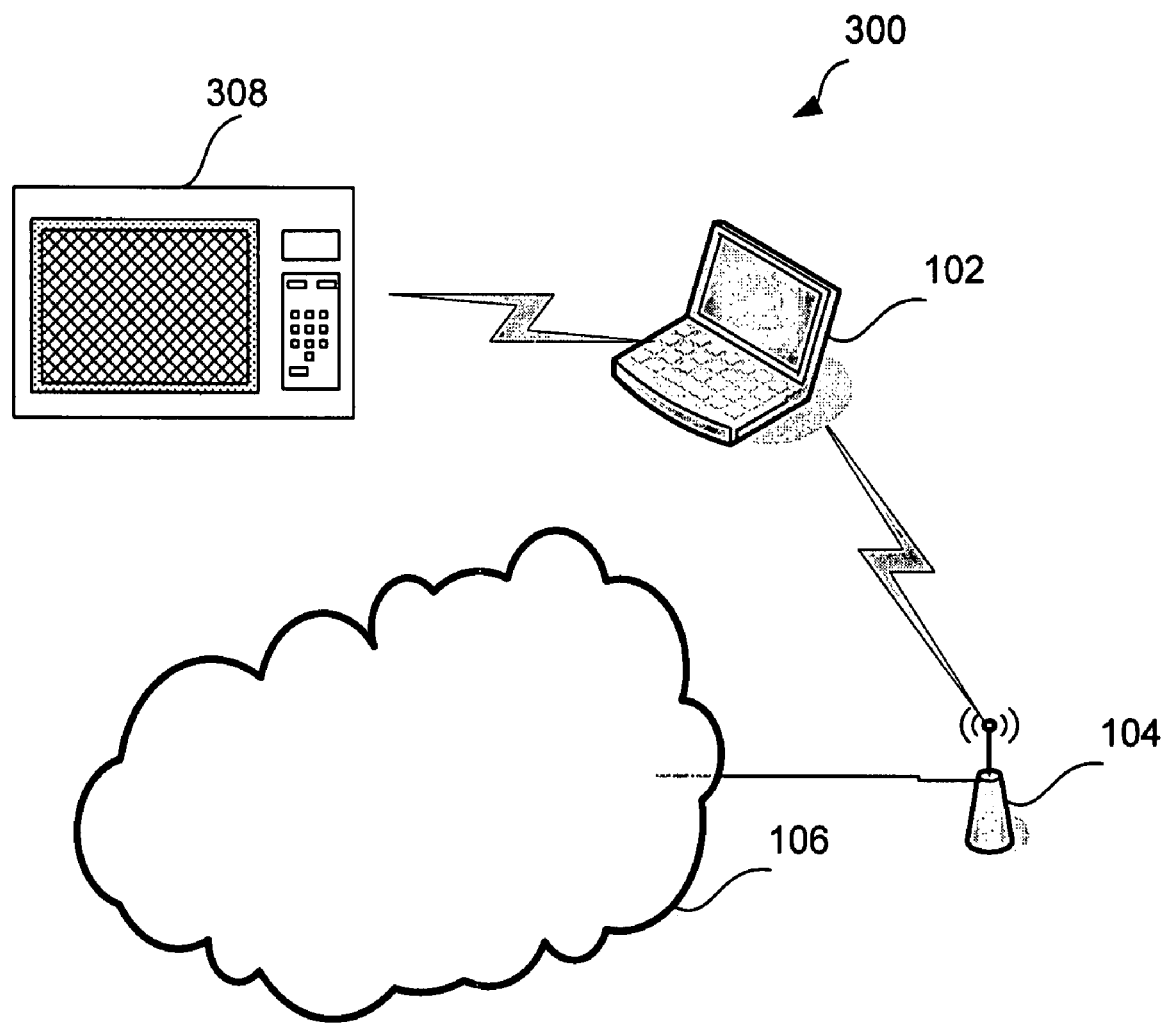
FIG. 1C is a diagram illustrating an example of an environment in which a computing device may communicate packets over wireless networks in the presence of a source of interference.

More generally, any device that emits RF energy that is received by computing device 102 may act as a source of interference. FIG. 1C illustrates a system 300 where radiation from a device 308 (e.g., a non-802.11 compliant device) emits radiation within a frequency band overlapping with a frequency band of the channel utilized by the computing device 102 causes interference for computing device 102. The non-802.11 compliant source of interference may be, for example, a microwave oven.

The operating conditions illustrated in FIGS. 1A, 1B and 1C represent different conditions that may support different transmission data rates or that may require different forms of adaptation to support a suitable data rate at a suitable power level. To aid in selecting an appropriate corrective action in any scenario, channel conditions can be evaluated by a set of parameters. For example, a signal transmitted over the channel and received by a computing device (e.g., the computing device 102) may be characterized by a received signal strength. Channel conditions may be affected by interference (e.g., by a radio-frequency, or RF, interference) and amount of noise at an intended receiver and preclude the channel from achieving desirable transmitted data rate. Other factors may influence channel conditions as well and a computing device according to embodiments of the invention may be configured to determine parameters associated with these conditions.

By rapidly and accurately performing adaptations to support a suitably high data rate at a suitably low power level, a user experience with the user of device 102 may be improved. For example, when the data rate is suitably high, user of computer device 102 may experience rapid operation of computer device 102. When a suitably low power level is achieved, the user of computing device 102 may experience longer battery life. According to embodiments of the invention, computing device 102 may operate to control wireless communications in a fashion that improves the user experience.

Figure 2:
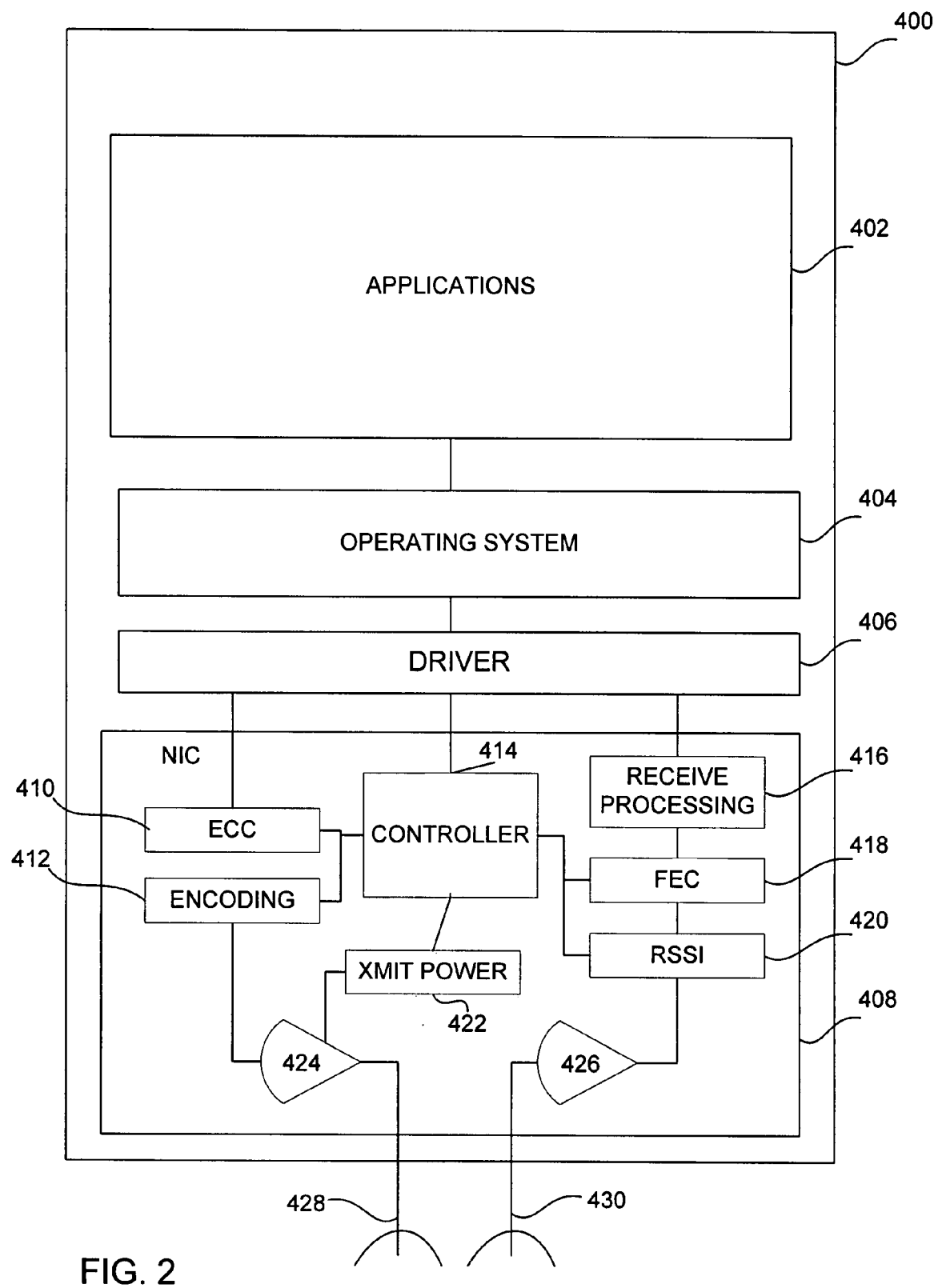
FIG. 2 is a diagram illustrating a computing device in which embodiments of the invention can be implemented.

The computing device 102, as well as any other computing devices capable of measuring wireless communication and taking corrective action according to embodiments of the invention may include components as illustrated in FIG. 2. Thus, a device 400 (e.g., a computing device 102) may include a network interface card (NIC) 408 which allows the device 400 to communicate over a network such as, for example, a wireless network. A driver 406 enables interaction between NIC 408 and other components of the device 400, such as, for example, operating system 406 and applications 402. Driver 406 may be computer-executable instructions encoded in a suitable computer-readable medium, which may include memory components on NIC 408 or may include memory storing operating system instructions for device 400 or other suitable memory.

NIC 408 may provide functionality of a receiver and transmitter configured to receive and transmit wireless communications. Components included in the receiver and transmitter are controlled by a controller 414. Controller 414 may receive commands from driver 406. In some embodiments, commands for controller 414 may be generated within components of operating system 404 or applications 402 and passed through driver 406 to controller 414. Similarly, status information concerning the operation of NIC 408 may be collected within controller 414 and passed to driver 406 or passed through driver 406 to operating system 404 or applications 402. Accordingly, control functions for any of the components within NIC 408 may be implemented within controller 414 or may be implemented within driver 406, within components of operating system 404, or within applications 402. Accordingly, the aspects of the invention relating to control of components of NIC 408 may be implemented by configuration of controller 414, programming within driver 406 or software components within operating system 404 or applications 402. However, the specific mechanism by which control functions are implemented is not critical to the invention and any suitable implementation may be employed.

To send packets from the device 400, the packets may be encoded using an ECC component 410 providing error control coding of any suitable type. For example, the encoding may use a multi-bit error correcting code. In the embodiment illustrated, ECC component 410 may add a number of error control bits to each packet to be transmitted. The number of error control bits added to a packet may be configurable in response to commands from controller 414. Altering the number of bits per packet used for error control coding is a possible adaptation that may be made in NIC 408 for poor channel conditions. For example, more error control bits may be added in a noisy channel in which frequent errors occur. However, increasing the number of bits used for error correction reduces the percentage of bits used for data transmission.

An encoding component 412 may implement any suitable encoding according to a data transmission protocol used for wireless communication. Encoding implemented within encoding component 412 may use a modulation scheme that is configurable based on input from controller 414. The modulation scheme used in encoding component 412 may also be used to adapt to channel conditions. For example, encoding component 412 may support a range of encoding schemes with a variable number of bits per symbol. To adapt to noisy channels, encoding component 412 may be controlled to use an encoding scheme with a low number of bits per symbol. Conversely, in a high-quality channel, encoding component 412 may be controlled to use an encoding scheme with a large number of bits per symbol, thereby increasing the data transmission rate.

The encoded data are then transmitted by a transmitter 424 at a transmit power level controlled by a transmit "Xmit" power controller 422. Transmission may be made via one or more transmit antennae 428. The transmit power level may also be controlled by controller 414 and may serve as a further mechanism to adapt to channel conditions. For example, in a noisy channel, a higher transmit power may be specified.

Corresponding processing may be performed on received packets. Packets received by the device 400 at one or more receive antennae 430 may be processed through a receiver 426 and then supplied to a received signal strength indicator (RSSI) component 420. RSSI may be obtained from a field in a received packet or it may be directly measured from the received wireless signal and then output in any suitable format. RSSI component 420 may output a signal strength or a signal to noise ratio (SNR) for any desired packets. In the embodiment illustrated, RSSI component 420 outputs a signal strength indication based on the received signal strength. However, the signal strength indication may be obtained in any suitable way. For example, it can be a field in a packet (e.g., an ACK packet) that contains an SNR value from a corresponding packet measured at the receiver side (e.g., a DATA packet).

In the embodiment illustrated, digital data are transmitted, accordingly, NIC 408 may include one or more components that decodes a received signal to produce a set of digital values for processing. The received bits may be modified in a forward-error correction (FEC) component 418 implementing forward-error decoding. In the embodiment illustrated, FEC component 418 performs an operation that is the inverse of that performed by ECC component 410. FEC component 418 analyzes the received bits, including the error correction bits, and determines the number of bits in error in each received packet. Using an error correction algorithm, FEC component 420 determines the correct values for each bit that is incorrect and removes the error correction bits. In the embodiment illustrated, FEC component 418 is coupled to controller 414. Accordingly, controller 414 has access to information concerning the number of errors detected in each received packet. It should also be appreciated that other types of error correction coding and decoding may be utilized by the device 400.

The FEC component 418 is coupled to a received data processing component 416 which further processes the received packets. Received processing component 416 may perform any number of received processing operations. For example, received processing component 416 may include a buffer in which a received packet is stored until it is transferred for further processing within operating system 404.

In the embodiment illustrated, network interface card 408 may be implemented using technology as is known for constructing wireless network interface cards. Accordingly, transmitter 424 and receiver 426 may be a transmitter and receiver, respectively, as is known in the art. Similarly, antennas 428 and 430 may be implemented using known antennae technology. Likewise, the error correcting coding implemented by ECC component 410 and FEC component 418 may be performed according to a known error correction algorithm. Likewise, the encoding performed in encoding component 412 may be performed in accordance with an 802.11 standard or in any other suitable way. The transmit power may be controlled by transmit power component 422 also using conventional components. Also, the received signal strength may be measured in RSSI component 420 in a conventional way, and receive processing component 416 may be implemented using conventional components. Controller 414 may also be implemented using conventional technology. For example, all of the components within NIC 408 may be implemented in a single integrated circuit chip or in multiple integrated circuit chips using technology currently known for constructing network interface cards.

However, it should be appreciated that components illustrated in FIG. 2 are shown by way of example only and not to limit the scope of the invention. Any other suitable components may be included in the device 400. Furthermore, functionality provided by some embodiments of the invention may be implemented on different components of the device 400. For example, the device 400 may also include a user interface (not shown) indicating the strength of the received signal and other parameters. For example, the user interface may include a bar indicator providing the strength of a signal that is currently being received. In embodiments described below, a received signal strength indication is used in conjunction with a packet error rate to automatically detect interference. The same information used for automatic processing may likewise be presented to a user to support manual processing or diagnosis of network problems. Accordingly, a user interface may present an indication of received signal strength in conjunction with an indication of a packet error rate.

Regardless of how implemented, the device 400 may be configured to detect and respond to channel conditions in novel ways. Configuration of device 400 to perform processes according to embodiments of the invention may be implemented by control algorithms within controller 414, driver 406, operating system 404, applications 402 or in any other suitable way.

Adaptation for channel conditions is known and part of the corrective action taken by device 400 in response to channel conditions may include known adaptations. However, some known adaptations may be replaced by novel adaptations. For example, it is known to adapt transmitted data rates based on an RSSI measurement. If the RSSI is high, which may be interpreted as an indication that the received signal is strong, a higher transmitted data rate may be chosen to exploit the strong signal. However, the inventors have appreciated that high RSSI does not account for different factors of the environment such as, for example, hidden terminals or interfering devices (e.g., the device 308). Consequently, if some form of interference exists in the environment and may possibly be responsible for packet collision, co-channel interference or other undesirable events, the transmitted data rate may be adapted to conditions falsely identified as favorable (e.g., a strong received signal). Therefore, a more reliable identification of a current channel condition may be desired. Furthermore, adaptive measures other than transmitted data rate adaptation may be more appropriate in certain situations.

In some embodiments of the invention, to determine what adaptive and/or corrective measures are suitable for current channel conditions, interference may be detected, along with an identification of a type of the interference. To detect the interference, certain measurements of a status of a channel may be taken. These measures may include the RSSI, but they may also include other characteristics that may be useful in determining channel conditions.

Figure 3:
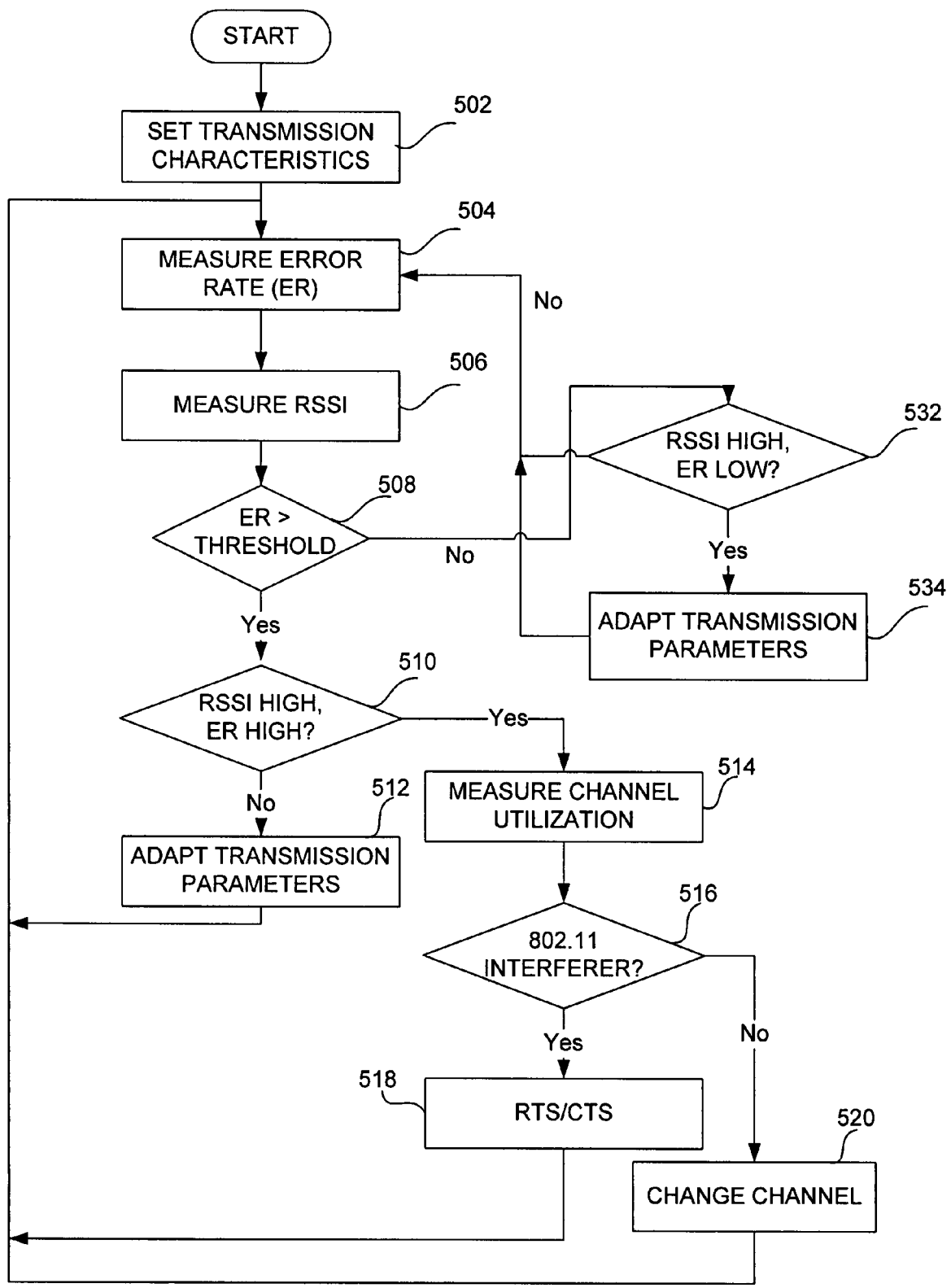
FIG. 3 is a flowchart of a method of adapting to channel conditions when a source of interference is detected according to some embodiments of the invention.

FIG. 3 is a flowchart illustrating a method of adapting to channel conditions according to some embodiments of the invention. The process may be performed with a device such as device 400 (FIG. 2). The process starts at block 502 where transmission characteristics for a channel may be set. Initial transmission characteristics may be set at block 502 in any suitable way. In the embodiment illustrated, conventional processing to set initial transmission characteristics may be performed at block 502.

The process then continues to block 504 where an error rate (ER) may be measured using any suitable method. The ER may be a packet error rate which is a percentage (or an indication of other form) of packets not successfully received by a receiver to the number of packets sent to the receiver. In some embodiments, a delivery rate may be measured instead of an error rate. Because the delivery rate and error rate are mathematically related, either of these values may be used for processing according to embodiments of the invention. Accordingly, the term error rate should be broadly interpreted to include any values indicative of errors regardless of the format in which they are expressed.

A packet error rate may be computed using conventional processing. For example, a device transmitting a packet may determine that an error occurred in transmission if the transmitting device does not receive an acknowledgment from the intended recipient of the packet. Accordingly, a device transmitting packets may determine the error rate associated with the packets it transmits.

Though, in other embodiments, other measures of error rate may be used. For example, if a bit error rate may be determined, the ER may be a bit error rate indicating a rate of corrected bits in each received packet (e.g., when a multi-bit error correcting code was applied to the packet before it was sent). The FEC component 418 or any other suitable component may be used to measure the ER based on errors associated with packets sent to device 400. In embodiments in which information may be received from a device receiving packets transmitted by device 400, the bit error rate as measured by the receiving device may be communicated to device 400 or any other suitable device in which the process according to FIG. 3 is performed and may therefore be available for processing at block 504.

In block 506, RSSI may be measured. In the embodiment illustrated, the received signal strength indicator is an RSSI (e.g., an ACK RSSI) or a SNR. However, any suitable measure of a signal strength may be used in the process of FIG. 3 and any suitable signal strength may be measured at block 506. The RSSI component 420 may be used to measure and output the RSSI in any suitable format.

In decision block 508, the ER is compared to a threshold and, if the ER is less than a threshold, the process branches to decision block 532 where it is determined whether the RSSI is high and the ER is low. If the answer is "yes," which may indicate improved channel conditions, the process continues to block 534 where adaptation based on the improved channel conditions may be performed. For example, a transmitted data rate may be increased. It should be understood that any suitable adaptation may be carried out.

Upon performing the adaptation in block 534, the process may loop back to block 504 where the error rate may be measured again.

If the answer to the question posed at decision block 532 is "no," no adaptation may be required or be desirable. For example, if the RSSI is low (not shown) while the ER is high, the process may loop back to block 504. However, it should be understood that, if desirable, any adaptation may be carried out at these conditions as well.

If it is determined at block 508 that the ER is greater then the threshold, the process branches to decision block 510, which begins a subprocess through which further information concerning channel characteristics is determined and appropriate adaptation or other corrective actions may be taken.

The threshold applied at decision block 508 to determine whether adaptation or other corrective action is required may be determined in any suitable way. The threshold may be set at a predetermined level. Alternatively, the threshold may be set adaptively, such as based on an initial measurement of an error rate when device 400 is configured for wireless communication or based on a throughput required for a wireless channel in order to support a data rate required for proper operation of one or more applications on device 400. However, the specific mechanism used to set the threshold used at decision block 508 is not critical to the invention and any suitable method for setting the threshold may be used. It should be appreciated that the RSSI is shown as measured in block 506 before it has been determined, in block 508, whether the ER is below the threshold by way of example only. Alternatively, the RSSI may be measured after performing processing at block 508.

If it has been determined in block 508 that the ER is above a threshold, the process proceeds to decision block 510 where measured levels of RSSI and ER are analyzed. In the embodiments illustrated, the process branches at decision block 510 based on whether the measured levels of RSSI and ER are both high. High levels may be determined in any suitable way. For example, high levels may be identified based on separate thresholds for RSSI and ER, which may be determined in any suitable way. The thresholds may be predetermined values or may be determined dynamically as device 400 operated. For example, a high RSSI may be determined relative to an average RSSI measured over an interval. The ER threshold may or may not be the threshold used in block 506. It should be appreciated that values of the RSSI and ER thresholds may vary with, for example, a transmitted data rate, as will be described in more detail below. In addition, these thresholds may correlate with each other.

Figure 4:
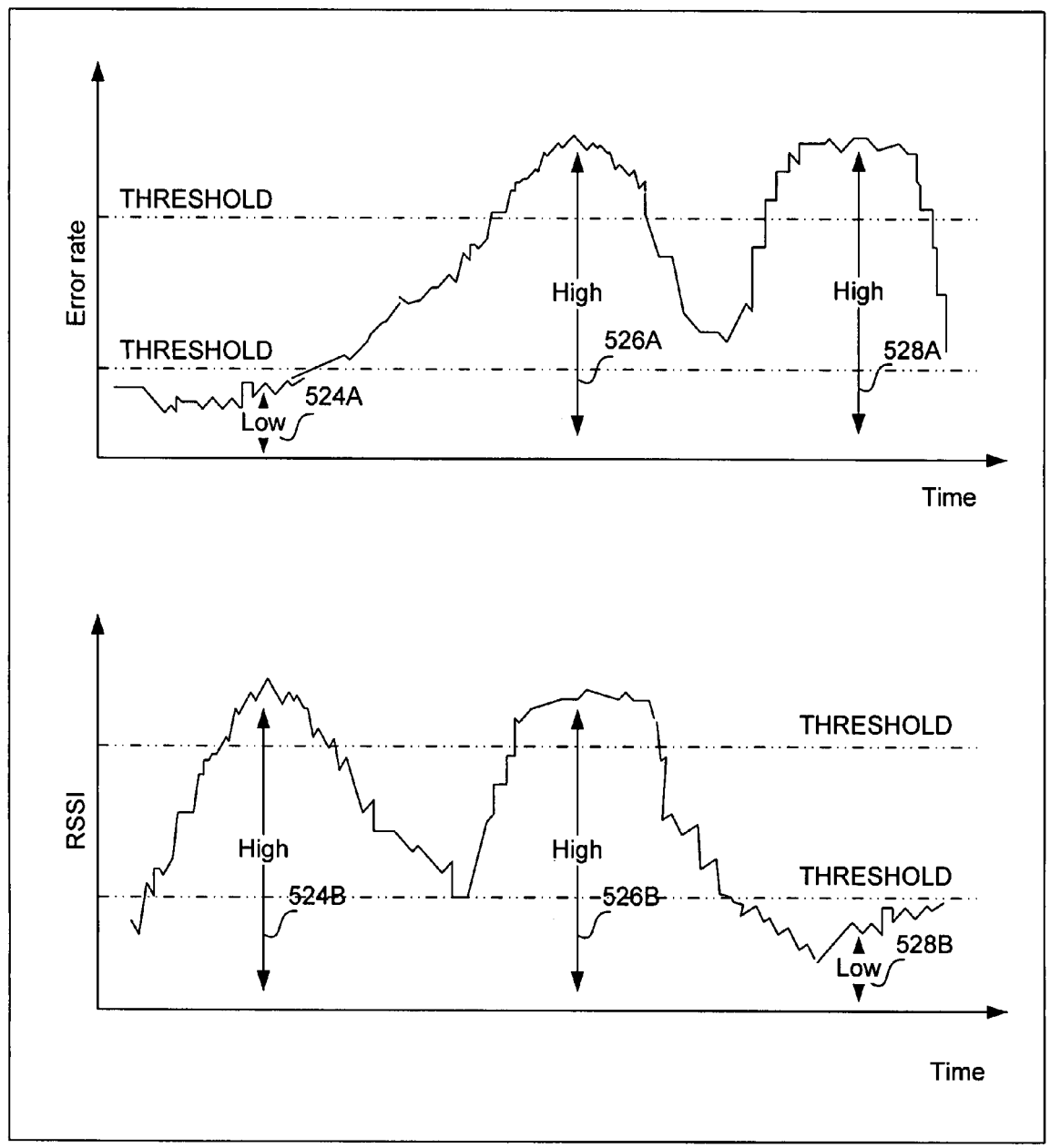
FIG. 4 is a sketch illustrating correlation between an error rate and a received signal strength indication (RSSI) in various operating scenarios.

FIG. 4 illustrates examples of three different situations demonstrating how the measured RSSI and ER may be used to determine whether interference is affecting channel conditions. At a first time, the ER is low and the RSSI is high, which is shown by way of example only and not to limit the scope of the invention by lines 524A and 524B. This condition may indicate a normal operation of a wireless channel because when the received signal is strong, a small number of errors is encountered. At a second time, as lines 526A and 526B indicate, both the ER and RSSI are high, which may be an indication of some type of interference which causes the ER to be high even if the RSSI is high. In this scenario, the high ER reveals that interference, not a strong signal received from another wireless device sending data, causes the high RSSI. Finally, lines 528A and 528B show a situation where the ER is high while the RSSI is low. A weak received signal and multiple errors manifest a problematic situation on the channel that precludes a signal from another wireless device sending data being received reliably. However, such a problem may not be caused by interference.

Returning to FIG. 3, if it has been determined that both RSSI and ER are high, the process may branch at decision block 510 to block 514, which may represent the beginning of a subprocess to determine a type of interference that is present and to select an appropriate adaptation or other corrective action. Any suitable processing may be performed to identify a type of interference and to adapt or otherwise correct for the interference. In the example of FIG. 3, the subprocess for identifying and adapting to a source of interference involves measuring a channel utilization at block 514. Channel utilization may be determined from the percentage of time that the channel is in a busy state, which may be determined in any suitable way. The measured channel utilization may indicate the source of interference present. For example, if a wireless noise floor is high for long periods of time, the source of interference may be a non-802.11 device, such as microwave 308 illustrated in FIG. 1C. The wireless noise floor may be identified to be high in any suitable way. For example, it may be identified that the wireless noise floor is high if the RSSI has been high for a long period of time. Conversely, if the RSSI increases and decreases, resulting in a relatively lower channel utilization, an 802.11 device may be indicated.

Accordingly, channel utilization may be used to indicate a type of interference. The type of interference source, whether an 802.11 interferer or a non-802.11 interferer, may dictate the type of adaptation or corrective action that can be effective. Accordingly, the process branches at decision block 516 based on the type of interference source detected.

If the measured channel utilization indicates an 802.11 interferer, the process branches to block 518. At block 518, an RTS/CTS signal is transmitted. Such signals may signal to an 802.11 interferer that it is transmitting on a channel that is causing interference for other devices. Transmission of these signals may cause the interferer to alter its transmission characteristics, ameliorating the interference.

It should be appreciated that processing at block 518 is representative of one possible corrective action that may be performed in response to detection of an 802.11 interferer. Different or additional steps may be taken to correct or adapt to an 802.11 interferer.

Regardless of the specific actions performed at block 518, the process may then branch back to block 504 where the error rate may be measured again. Looping the process back in this fashion may determine whether the adaptation or other corrective action was effective. In subsequent passes through the process illustrated in FIG. 3, different adaptations or other corrective actions may be performed if it is determined that previous adaptations or other corrective actions were not effective.

Conversely, if as a result of channel utilization measurements performed at block 514 a non-802.11 interferer was indicated, the process may branch from decision block 516 to block 520. At block 520, adaptation or other corrective action appropriate for channels containing a non-802.11 interferer may be performed. In the embodiment illustrated in FIG. 3, processing at block 520 involves changing the channel. However, any suitable adaptation may be performed. Regardless of the specific adaptation or other corrective action performed at block 520, the process may again branch back to block 504 where the error rate is measured. The process may then be repeated with different or additional corrective actions being performed in response to the conditions detected.

If it is determined in decision block 510 that the RSSI and ER are not both high, adaptation or other corrective action appropriate for a channel exhibiting a high error rate in which a source of interference is not detected may then be performed. Accordingly, in the example of FIG. 3, if RSSI and ER are not both high, processing branches to block 512. If processing reaches block 512, a channel condition interfering with communications, other than a source of interference, is indicated. Any suitable processing may be performed at block 512. The processing at block 512 may include further tests to determine the channel condition interfering with communications or to adapt or otherwise correct the channel condition. In the embodiment illustrated, the processing at block 512 involves adapting transmission parameters to reduce ER. Transmission parameters such as, for example, transmitted data rate and transmit power level may be adapted accordingly in block 512. For example, if the RSSI is low and the ER is high, the transmitted data rate may be decreased and/or the transmit power level may be increased.

Parameters other than transmitted data rate and transmit power level may also be adapted to the channel conditions. For example, a different type of error correction coding may be used, different technology may be utilized, a packet retransmit number may be adjusted, etc. It should be appreciated that any suitable adaptation may be employed. Regardless of the adaptation used, upon completion of adapting transmission parameters in block 512, the process returns to block 504 where ER is again measured to determine if the adaptation was successful.

In the embodiment illustrated in FIG. 3, adaptation or other corrective action is taken in response to a relatively high error rate. However, in some embodiments, it may be desirable to identify deteriorating channel conditions in advance of the conditions being so bad that a relatively high number of transmitted packets are not successfully received. According to one aspect of the invention, trends in error rates may be used to predict deteriorating channel conditions and, in some embodiments, may be used to initiate adaptation or other corrective action in advance of conditions deteriorating to the point that an unacceptably high number of packet transmissions fail.

Figure 5:
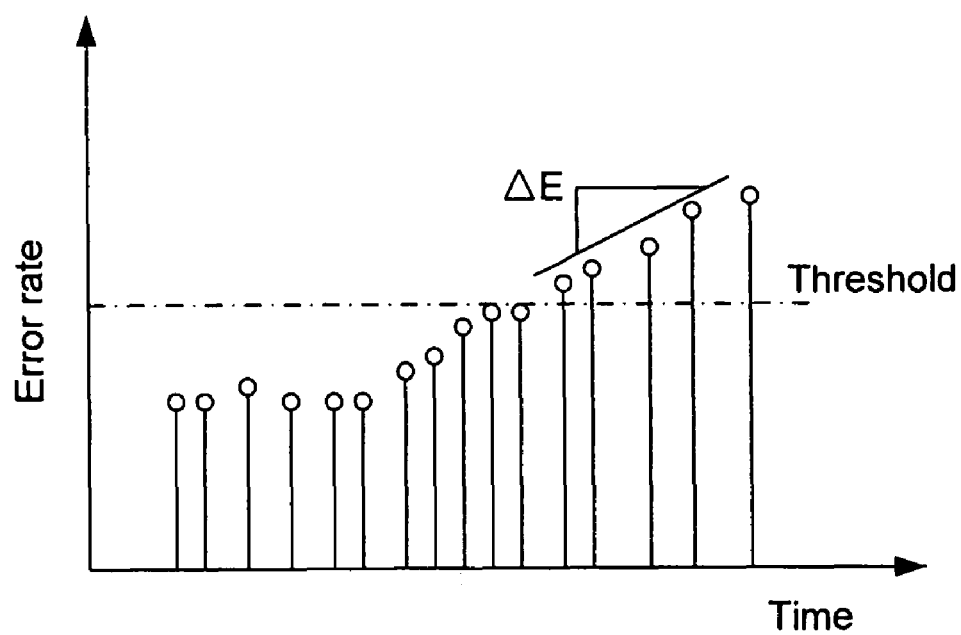
FIG. 5 is a sketch illustrating a trend in an error rate that may indicate deteriorating channel conditions according to some embodiments of the invention.

As discussed above, different types of packet errors may be encountered in a wireless network. By way of example only and not to limit the scope of the invention, different indications of these errors (e.g., a packet error rate, a bit error rate and other types of error rate indicators) are collectively referred to herein as an ER. As channel conditions vary with time, the ER may vary as well. Therefore, different trends may be identified in ER measurements made over time. FIG. 5 shows an example of an ER profile with a slope ΔE, which may manifest a trend in the ER indicative of deteriorating channel conditions.

In some embodiments of the invention, the ER may be used to determine current channel conditions as well as predict possible problems in the conditions. For example, if the ER is increasing, this may indicate that the channel conditions are deteriorating, e.g., due to an interference source getting closer to the wireless device. Accordingly, by observing certain trends in the ER, adaptive and/or corrective measures may be taken to adjust to and/or improve the channel conditions. Moreover, the adaptation may be carried out before the channel conditions degrade to unacceptably poor levels. Furthermore, by monitoring and analyzing the ER, the effectiveness of the adaptation may be evaluated.

Figure 6:
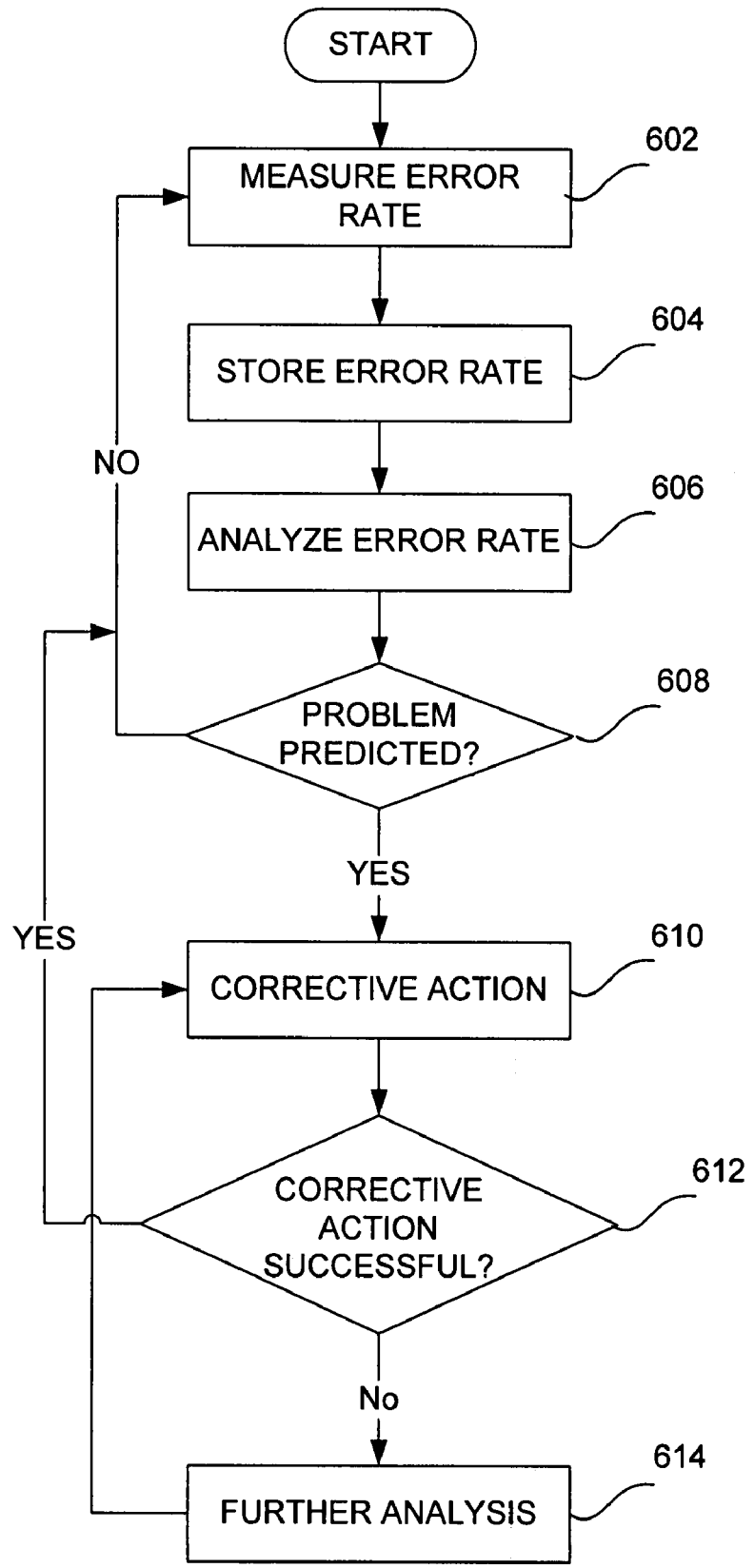
FIG. 6 is a flowchart of a method of adapting to deteriorating channel conditions according to some embodiments of the invention.

FIG. 6 illustrates a method of adapting to channel conditions based on measuring the ER according to some embodiments of the invention. In the embodiment illustrated, the ER is determined from forward error correction. Such an ER may indicate, for example, a degree of difference between a packet as transmitted and a packet as received. This degree of difference may be expressed in any suitable format, for example, as a number of bit errors corrected for a digital signal, or a Euclidean distance for an analog signal, etc.

Upon starting the process, in block 602, the ER is measured using any suitable method. The ER may be measured, for example, in an error correction circuit (e.g., the FEC component 418 or in any other suitable component) that may be adapted to output an indication of a degree of error corrected.

The measured ER may be stored at block 604. The process then proceeds to analyzing stored ER values in block 606. Any suitable number of stored ER values collected over any suitable time may be analyzed. Any suitable component such as, for example, the controller 414 shown in FIG. 2, may be utilized to detect the trend.

Any suitable trend indicative of a potential problem developing in a channel may indicate deteriorating channel conditions. FIG. 5 illustrates examples of trends that may be detected to indicate deteriorating channel conditions. For example, if the average slope of the error rate as a function of time exceeds a predetermined value, deteriorating channel conditions may be identified. Additionally, combinations of parameters may be used to identify a trend indicative of deteriorating channel conditions. For example, a relatively high slope in combination with an error rate above a threshold may be used as a trend indicative of deteriorating channel conditions. However, analysis of block 606 is not limited to analyzing the measured error rates for a single trend indicative of deteriorating channel conditions. The collected data on error rates may be analyzed to detect any number of trends that may be indicative of deteriorating channel conditions.

Regardless of the specific analysis performed at block 606, once the analysis is completed, processing proceeds to decision block 608. In decision block 608, it may be determined whether any problem has been identified as indicated by a trend in the ER. If no problem is predicted based on the analysis of the error rate performed at block 606, the process branches from decision block 608 back to block 602 where further measurements of the error rate may be made. The process may be repeated iteratively until a trend is detected.

Conversely, if a problem has been identified based on analysis of the error rate performed at block 606, the process branches from decision block 608 to block 610 where one or more corrective actions may be performed. Any suitable corrective actions may be performed at block 610. For example, transmission parameters may be adapted to preclude deteriorating channel conditions from interrupting wireless communications.

In some scenarios, corrective action performed at block 610 may include changing the channel used for wireless communications or even changing a media used for wireless communications. Such adaptations are generally regarded as undesirable because communications may be temporarily suspended while a channel or communications media is changed. However, in the process of FIG. 6 in which deteriorating channel conditions are identified before communications are disrupted, corrective action at block 610 may include waiting for a suitable time to perform corrective action. For example, processing at block 610 may include monitoring wireless transmission to identify a period of low activity for wireless communications and changing the channel or communications media during a period of low activity.

Once corrective actions are performed at block 610, processing proceeds to decision block 612 where it is determined whether the corrective actions were successful. The ER and detected trends, or any other parameters, may also be used to evaluate the effectiveness of corrective actions. For example, if the ER has decreased, it may be determined that one or more of the performed corrective actions was successful. If the answer is "yes," the process returns to block 602. Otherwise, if it is determined that the corrective actions were not successful in adapting to channel conditions (e.g., the ER is still high or still increasing), further analysis may be performed in block 614. As a result of the analysis, it may be determined that another corrective action (possibly a more strenuous measure) may be required, which is realized when the process loops back to block 610. For example, it may be appropriate to switch to another channel if conditions on the currently used channel are trending toward an error rate that would preclude packets from being reliably transmitted.

As discussed above, an RSSI, possibly in combination with an ER may be used to determine channel conditions. Other parameters may similarly be used to assess whether adaptation or other corrective action is required and an appropriate corrective action given channel conditions. For example, a signal-to-noise ratio (SNR) may be used in combination with a packet delivery rate (PDR). Both of these parameters may also be obtained by a network interface card using conventional processing. The inventors have appreciated that there is a relationship between PDR, SNR and transmitted data rate that may be used to adaptively set a transmitted data rate. Such an adaptation may be performed in response to a detected problem, in response to a trend predicting a future problem or may be performed at any suitable time. However, in the embodiment illustrated, the process is performed when a currently selected data rate does not support reliable communication.

Figure 7A:
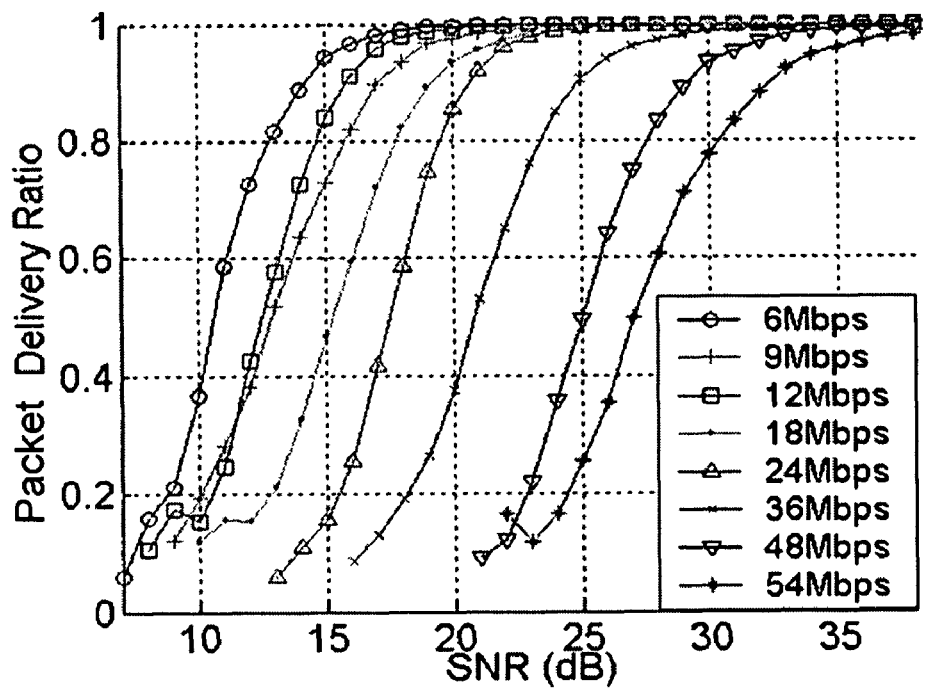
FIG. 7A is a plot of a relationship between packet delivery rate (PDR) and signal-to-noise ratio (SNR) for eight different transmitted data rates.

FIG. 7A illustrates examples of eight SNR/PDR curves for different transmitted data rates. Experiments conducted by the applicants have showed that the SNR/PDR relationship as in the examples demonstrated in FIG. 7A may be consistent over time in different indoor and outdoor environments, given a certain sender/receiver pair. It should be appreciated that sender and receiver may be any suitable devices such as, for example, the device 400. It should be appreciated that sender and receiver devices are relative terms which may change over time as most wireless devices may implement functionality of transmitter and/or receiver.

To build the curves as shown in FIG. 7A, multiple measurements of the SNR and PDR would be required. However, applicants have appreciated that adaptive rate transmission based on the relationship between PDR and SNR does not require collecting data to fully construct the curves shown in FIG. 7A. To simplify the calibration and decrease the time required to perform the calibration, the relationship between the SNR and PDR for a certain transmitted data rate may be characterized by two thresholds, which may be illustrated in FIG. 7B.

Figure 7B:
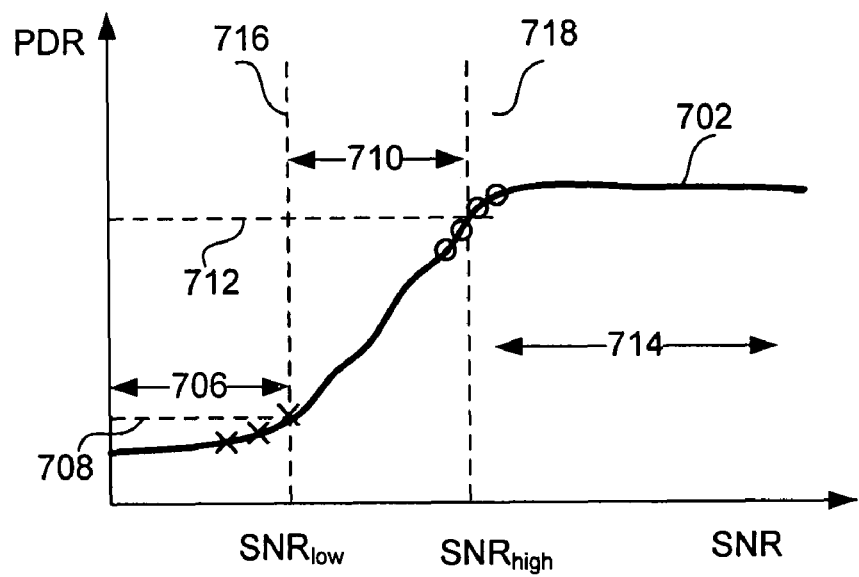
FIG. 7B is a plot of an exemplary relationship between packet delivery rate (PDR) and signal-to-noise ratio (SNR)

For simplicity, FIG. 7B illustrates an example of an SNR/PDR curve 702 showing generally a relationship between the SNR and PDR at a single data rate.

Because different sender/receiver pairs may be characterized by different SNR/PDR curves, a calibration may be required for a sender/receiver pair to obtain an SNR/PDR curve similar to the curve 702, which may involve taking multiple measurements of the SNR and PDR. The calibration may be, for example, an on-line calibration, i.e., a calibration performed while the sender/receiver pair is in operation and may entail transmitting packets at different signal levels and detecting PDR.

In FIG. 7B, three portions may be defined by the curve 702: a loss region 706, a receipt region 714 and a "grey" region 710. In this example, the loss region 706 may be defined as a region with an SNR corresponding to a PDR less than some threshold 708, which is too low for use in effective communication. For example, the threshold may be 10%. Receipt region 714 may be defined as a region with a PDR greater than a threshold 712, which may be, for example, 90%. The "grey" region 710 may be defined as a region between the loss region 706 and the receipt region 714. The SNR at the boundary between the loss region 706 and grey region 710 may be defined as $SNR_{low}$ and the SNR at the boundary between grey region 710 and receipt region 714 may be defined as $SNR_{high}$. As shown in FIG. 7B, $SNR_{low}$ is associated with the threshold 716 and $SNR_{high}$ is associated with the threshold 718.

To determine the thresholds 716 and 718 for a transmitted data rate, only measurements of the SNR in the area where the PDR is about 10% and about 90%, respectively, are taken, as shown by respective crosses and circles. As can be seen, substantially fewer measurements are required to determine $SNR_{low}$ and $SNR_{high}$ than would be required to fully determine the shape of curve 702. In the embodiment illustrated, the $SNR_{low}$ threshold may be set to the smallest SNR corresponding to a PDR of about 10% transmitted data rate. By way of example only and not to limit the scope of the invention, $SNR_{low}$ for a particular transmitted data rate may be determined by transmitting packets with varying power levels until a PDR rate of approximately 10% is detected. It should be appreciated both the SNR and PDR can be measured in any suitable way. For example, these parameters may be measured in the controller 114.

Similarly, in the embodiment illustrated, $SNR_{high}$ may be measured as the smallest SNR corresponding to a PDR of about 90%. However, $SNR_{high}$ may be determined in other ways. Because interference in a channel may result in lower measures of PDR (e.g., packet losses may be due to packet collisions), the $SNR_{high}$ threshold may be capped, for example, as $SNR_{high}=SNR_{low}+\delta$, where $\delta$ is a value of a deviation defined as a certain threshold. In one embodiment, $\delta$ may be set as 7 decibel (dB). Therefore, in some embodiments the $SNR_{high}$ threshold may be as set according to the following equation:

$$SNR_{high} = \min\left(SNR_{low} + \delta, \underset{SNR}{\mathrm{argmin}} PDR(SNR) > 90\%\right)$$

As a result of the calibration in which $SNR_{low}$ and $SNR_{high}$ values are measured, a calibration table, an example of which is shown in FIG. 7C, may be built. The calibration table may contain values of the $SNR_{low}$ threshold and the $SNR_{high}$ threshold for different transmission data rates. As is illustrated in FIG. 7B, a relatively small number of measurements are required to identify $SNR_{low}$ and $SNR_{high}$ for each transmitted data rate. Accordingly, even if data for multiple transmitted data rates are included in the table of FIG. 7C, a relatively small number of measurements may be required to complete the table of FIG. 7C. As an example, the measurements required to complete the table of FIG. 7C for eight different data transmission rates supported by a network interface card may be made over a time window of approximately 100 milliseconds. Such measurements may therefore be made over a much smaller interval of time than would be required to construct the curves shown in FIG. 7A. Nonetheless, the table of FIG. 7D may be used in a method of adapting a transmitted data rate.

Figure 8A:
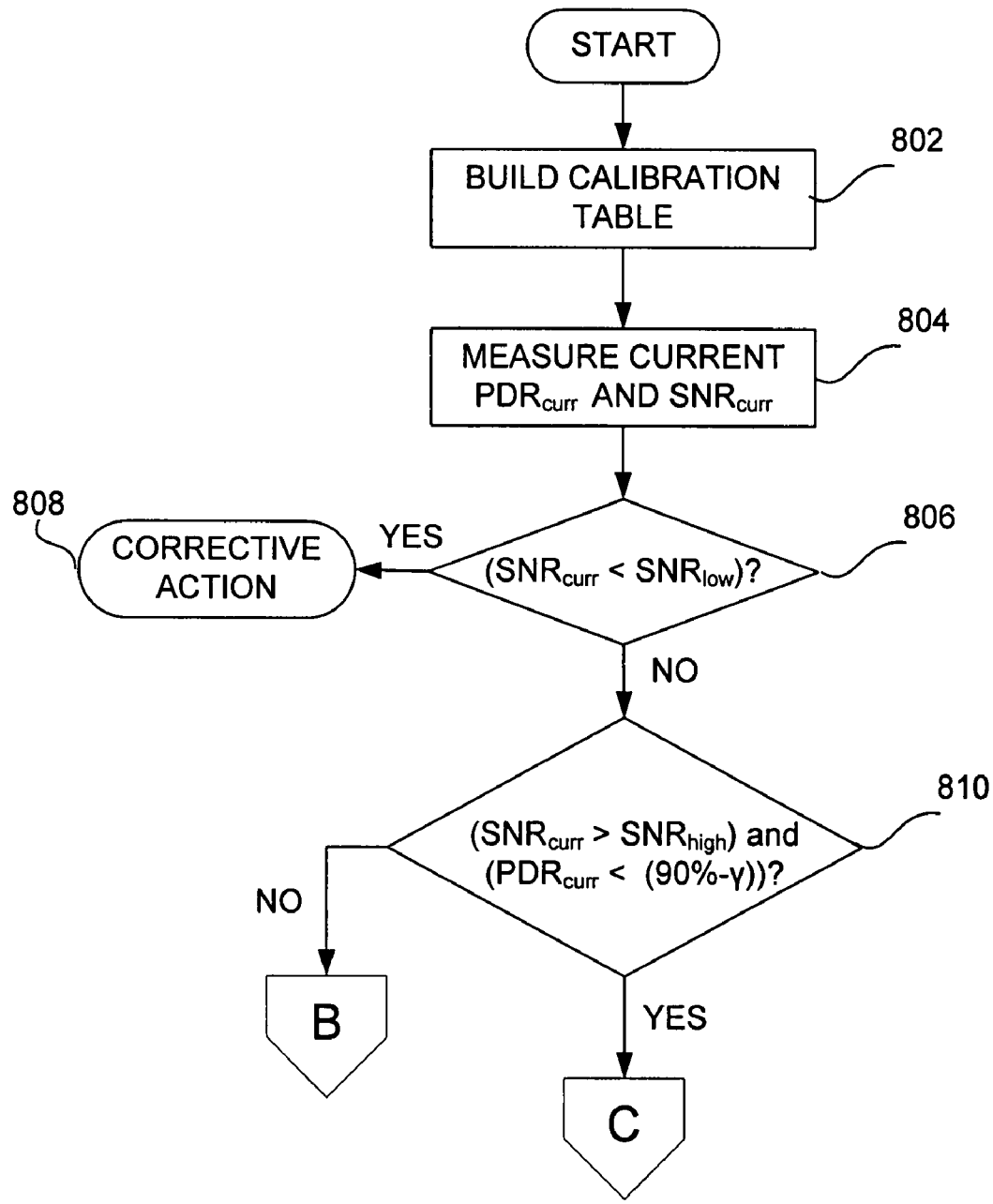
FIGS. 8A-8C, when connected at points B and C are a flowchart of a method of transmitted data rate adaptation based on measurements of a packet delivery rate (PDR) and a signal-to-noise ratio (SNR) according to some embodiments of the invention.
Figure 8B:
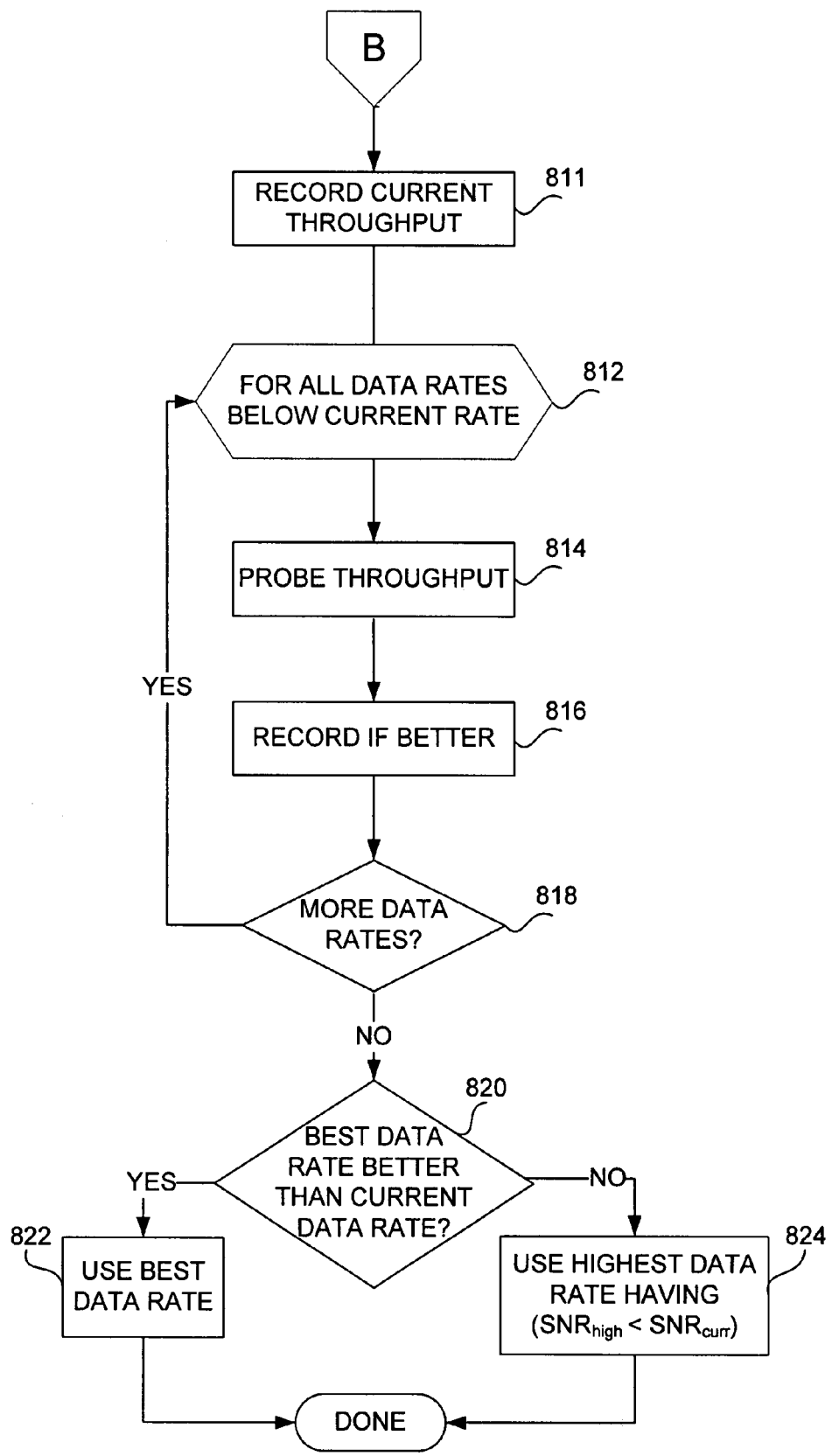
Figure 8C:
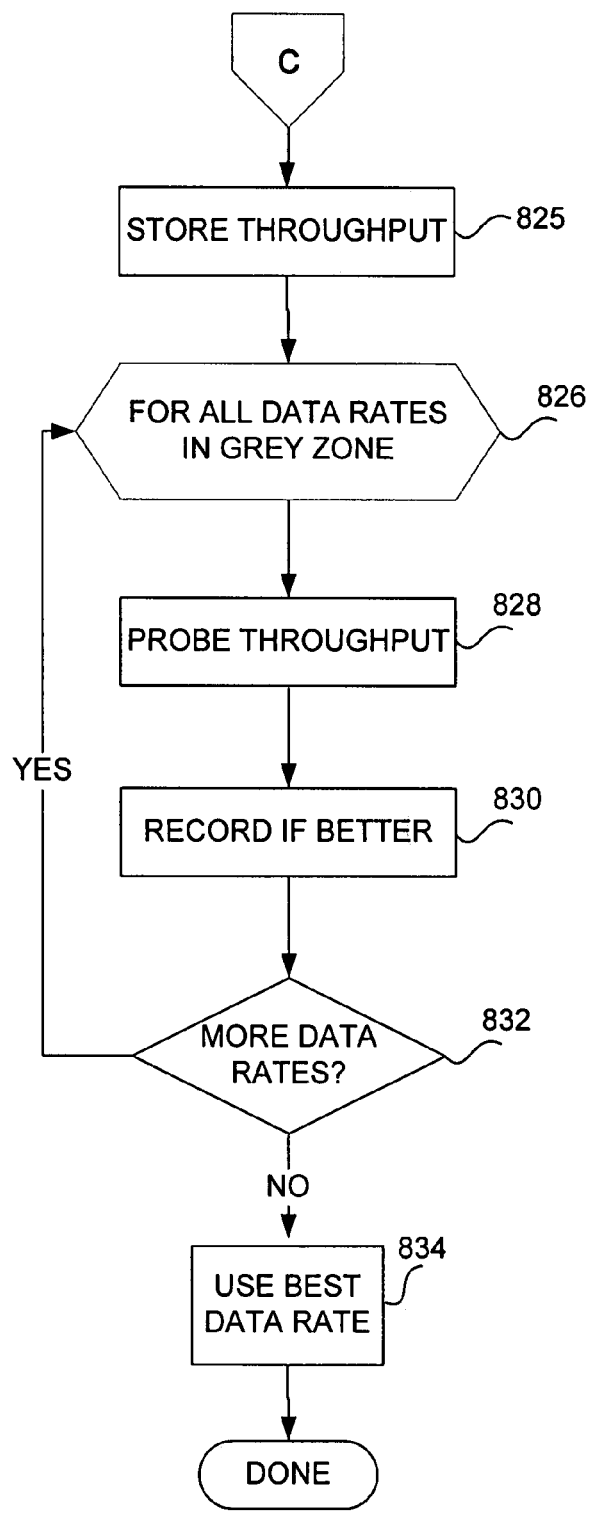

FIGS. 8A-8C illustrate a method of adapting a transmitted data rate based on the PDR and SNR measured as described above according to some embodiments of the invention. The method may be referred to as an SNR-Guided Rate Adaptation (SGRA).

The process starts at block 802 where the calibration table of FIG. 7C is built as described above. The calibration table may include SNR thresholds such as, for example, $SNR_{low}$ threshold 716 and $SNR_{high}$ threshold 718 for each of a plurality of possible transmit data rates. The table of FIG. 7C may be stored as a data structure in computer-readable media associated with device 400 or in any other suitable format.

In block 804, a current SNR, $SNR_{curr}$, and a current PDR, $PDR_{curr}$, may be measured in any suitable component and using any suitable way. In decision block 806, it is determined whether $SNR_{curr}$ is less than all values of $SNR_{low}$ stored in the table of FIG. 7C. If the answer is "yes," which indicates that current channel conditions may not support transmission based on $SNR_{curr}$, the process continues to block 808 where one or more corrective actions may be performed to ameliorate channel conditions. Such corrective actions may include increasing the transmit power level, changing channels, changing wireless media or otherwise attempting to create a channel condition under which communication may be supported. However, in the embodiment illustrated, if the process branches to block 808, adapting the data rate is unlikely to result in effective communication and corrective action, other than data rate adaptation, may be performed at block 808.

If the answer is "no," the process continues to decision block 810, where it is determined whether interference exists in the channel. As described above and pictured in FIG. 4, a large signal strength in combination with a high error rate may indicate a source of interference in the channel. The condition tested at decision block 810 may be regarded as an alternative embodiment of a test for channel interference. At block 810, it may be determined whether the $SNR_{curr}$ is greater than the $SNR_{high}$ while the $PDR_{curr}$ is less than (90%−γ), where γ may be an adaptive threshold that may be different for different data rates. As a specific example, γ may be set to 0.2. The comparison indicated for comparison block 810 may be performed for the measurements made for the data rate currently in use, but a similar test could be performed for one or more of the data rates for which measurements are available in the table of FIG. 7C.

If the answer to the question posed in decision block 810 is "yes," which may indicate interference, the process continues as illustrated in FIG. 8B. Otherwise, the process continues as illustrated in FIG. 8C.

In FIG. 8B, a data rate adaptation process suitable for use when interference is present is performed. The process begins at block 811 where a throughput achieved with the currently selected data rate is stored.

As indicated by block 812, a loop is then established in which probing is conducted to determine throughput for all data rates lower than current data rates. As shown in block 814, a respective throughput is probed for each lower data rate. Throughput may be probed in any suitable way. For example, test packets or actual network traffic may be transmitted and, based on the number of packets successfully received as indicated by ACK packets received, the actual throughput may be determined.

For a currently probed throughput, if its value is better than a value of a previously recorded throughput, the value of the currently probed throughput is recorded, in block 816. Any suitable component (e.g., controller 114) may be used for this purpose. From decision block 818, the process returns to block 812 for so long as further data rates remain to be probed.

When all lower data rates are probed, the process proceeds to decision block 820 where it is determined whether the transmitted data rate with the best recorded throughput provides a higher throughput than a current transmitted data rate. If the answer is positive, the current transmitted data rate is changed to the transmitted data rate with the best recorded throughput, as shown in block 822. If the answer is negative, the highest transmitted data rate with $SNR_{high}$ less than $SNR_{curr}$ may be used to transmit packets over the channel, as shown in block 824. The process may then terminate.

Conversely, if as determined at decision block 810, no interference is present, the process continues as shown in FIG. 8C. The process begins at block 825 where the throughput achieved with the current data rate is stored. The process then continues in a loop performed over all data rates for which SNRcurr falls in the "grey" region. These data rates may be identified from measurements made as part of the calibration process or which may have been stored in a table such as the table illustrated in FIG. 7C. The data rates to be probed have an $SNR_{high}$ greater than $SNR_{curr}$ and an $SNR_{low}$ less than $SNR_{curr}$. For all transmitted data rates for which $SNR_{curr}$ is in the "grey" region, as shown in block 826, a respective throughput is probed, in block 828. Probing may be performed in any suitable way.

In some embodiments, the probing may be performed according to the following heuristic. A per-rate packet loss ratio (PLR) may be maintained which is a packet loss ratio corresponding to a certain transmitted data rate. A correlation may be identified in relations between PLR and a transmitted data rate. Therefore, a lower transmitted data rate may have a lower PLR, while a higher transmitted data rate may have a higher PLR. The heuristic used to select an appropriate transmitted data rate may proceed to first determine whether a current PLR is greater than a threshold $P_R$, where R is a current selected transmitted data rate. If the answer is affirmative, the next lower transmitted data rate may be used. If a current PLR is lower than another threshold $L_R$, where ($L_R<P_R$), the next higher transmitted data rate may be used.

Regardless of how probing is performed, for a currently probed throughput, if throughput is better than a value of a previously recorded throughput, the value of the currently probed throughput is recorded, in block 830 along with the data rate producing that throughput.

If there are more transmitted data rates to analyze, which may be determined in block 832, the process returns to block 826. Otherwise, a current transmitted data rate is set to a recorded transmitted data rate with the highest throughput, in block 834. The process may then terminate.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computing device with wireless network interface adapted to communicate over a channel, the method comprising:
    measuring errors associated with packets communicated in the channel;
    measuring received signal strength in the channel;
    determining a source of interference in response to a determination that the measured errors associated with packets communicated in the channel exceeds a first threshold in combination with the measured received signal strength in the channel exceeding a second threshold, wherein the first threshold is associated with a measure of errors and the second threshold is associated with a signal strength;
    when the measured received signal strength exceeds the first threshold for a period of time exceeding a third threshold, determining that the source of interference is a non-802.11 source of interference; and
    when the measured received signal strength exceeds the first threshold for a period of time not exceeding the third threshold, determining that the source of interference is an 802.11 source of interference.

2. The method of claim 1, wherein the measure of received signal strength comprises an ACK RSSI.

3. The method of claim 1, further comprising:
    in response to a determination that the source of interference is the non-802.11 source of interference, modifying at least one characteristic of transmissions by the wireless network interface, the at least one characteristic comprising at least one of transmit power and transmitted data rate.

4. The method of claim 3, further comprising:
    further modifying the at least one characteristic based on a measure of errors associated with packets and a measure of received signal strength after modifying the at least one characteristic of transmissions.

5. The method of claim 4, wherein further modifying the at least one characteristic comprises at least one of increasing the transmit power and decreasing the transmitted data rate.

6. The method of claim 4, wherein further modifying the at least one characteristic comprises at least one of reducing the transmit power and increasing the transmitted data rate.

7. The method of claim 1, further comprising:
    in response to a determination that the source of interference is the 802.11 source of interference, transmitting an RTS and CTS signal.

8. Apparatus for interfacing a computing device to a wireless network, the apparatus comprising:
    a receiver adapted to receive a wireless signal, the receiver adapted to output an indication of a strength of a received wireless signal;
    circuitry adapted to output an indication of an error rate for transmitted packets; and
    computer-readable medium comprising computer-executable instructions that, when executed:
    indicate that a source of interference is present based on a combination of the indication that the strength of the received wireless signal is above a first threshold that is associated with strength of the received wireless signal and the indication that the error rate in transmitted packets is above a second threshold that is associated with error rate for transmitted packets; and
    determine a type of the source of interference based on an average value of the strength of the received wireless signal that is above the first threshold;
    wherein the computer-executable instructions, when executed:
        determine that the source of interference is an 802.11 source of interference when the average value of the strength of the received wireless signal is below a third threshold, and
        determine that the source of interference is a non-802.11 source of interference when the average value of the strength of the received wireless signal is above a fourth threshold, the fourth threshold being higher than the third threshold.

9. The apparatus of claim 8, wherein the indication of the strength of a received wireless signal comprises a signal to noise ratio.

10. The apparatus of claim 8, wherein the computer-executable instructions, when executed, in response to the determination that the source of interference is the non-802.11 source of interference, modify at least one characteristic of transmissions by the computing device, the at least one characteristic comprising at least one of transmit power and transmitted data rate.

11. The apparatus of claim 8, wherein the computer-executable instructions, when executed, in response to the determination that the source of interference is the 802.11 source of interference, transmit an RTS and CTS signal.

12. A method of operating a computing device having a wireless network interface, the method comprising:
measuring a packet error rate;
measuring a received signal strength;
indicating a source of interference when the measured packet error rate is above a first threshold associated with packet error rate and the measured received signal strength is above a second threshold associated with received signal strength;
determining a type of the source of interference based on an average value of the measured received signal strength that is above the first threshold;
when the type of the source of interference is determined to be an 802.11 source of interference, taking a first corrective action; and
when the type of the source of interference is determined to be a non-802.11 source of interference, taking a second corrective action that is different than the first corrective action.

13. The method of claim 12, wherein:
measuring the packet error rate comprises measuring a packet delivery rate; and
measuring the received signal strength comprises measuring a signal to noise ratio.

14. The method of claim 13, further comprising for each of a plurality of transmit data rates:
identifying a first signal to noise value corresponding to a low value of the packet delivery rate; and
identifying a second signal to noise value corresponding to a high value of the packet delivery rate.

15. The method of claim 14, wherein selecting the corrective action comprises probing throughputs for a plurality of transmitted data rates less than a current transmit data rate having the received signal strength above the second threshold to select a current transmitted data rate providing a highest throughput.

16. The method of claim 15, wherein selecting the corrective action further comprises selecting a transmit data rate with the second signal to noise value less than a currently measured signal to noise value.

17. The method of claim 14, further comprising when the packet error rate is not above the first threshold or the measured signal strength is not above the second threshold, probing throughputs for a plurality of selected transmitted data rates to select a transmitted data rate providing a highest throughput, the plurality of selected transmitted data rates each selected to have a first signal to noise ratio value that is less than a currently measured signal to noise value and a second signal to noise ratio value that is more than the currently measured signal to noise value.

18. The method of claim 17, further comprising setting a transmit data rate based on the selected transmitted data rate.

19. The method of claim 12, wherein determining the type of the source of interference based on the average value of the measured received signal strength and determination of channel utilization comprises:
determining that the source of interference is the 802.11 source of interference when the average value of the measured received signal strength is below a third threshold; and
determining that the source of interference is the non-802.11 source of interference when the average value of measured received signal strength is above a fourth threshold, the fourth threshold being higher than the third threshold.

* * * * *